April 7, 1964 H. R. UHTENWOLDT 3,127,781
MACHINE TOOL TRANSMISSION
Filed Feb. 6, 1961 4 Sheets-Sheet 4
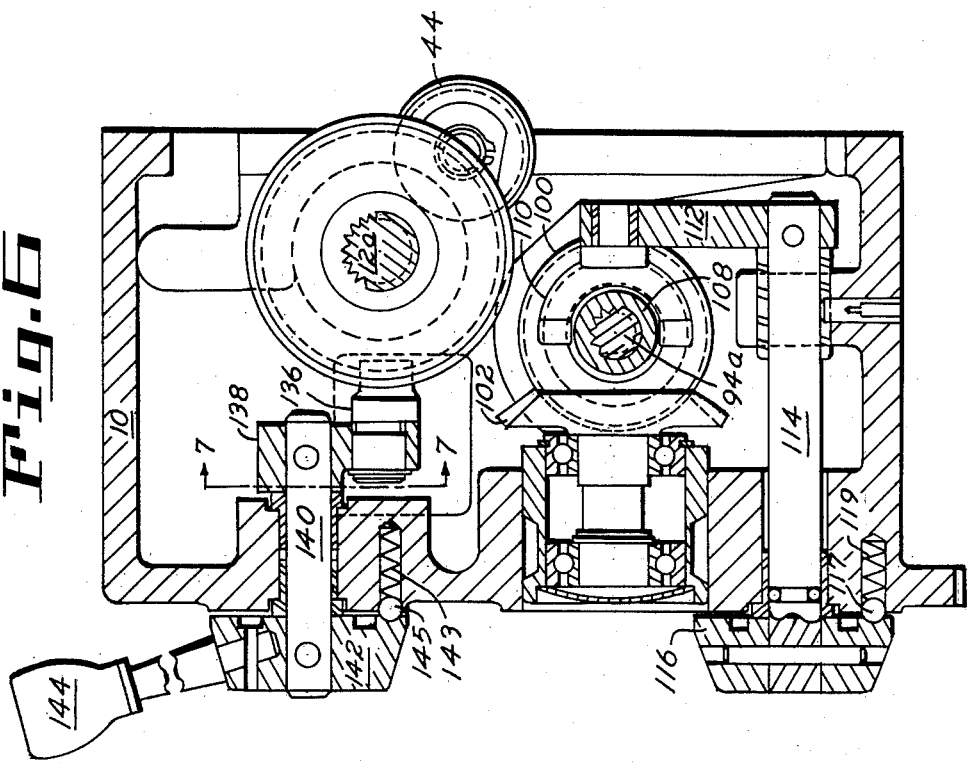
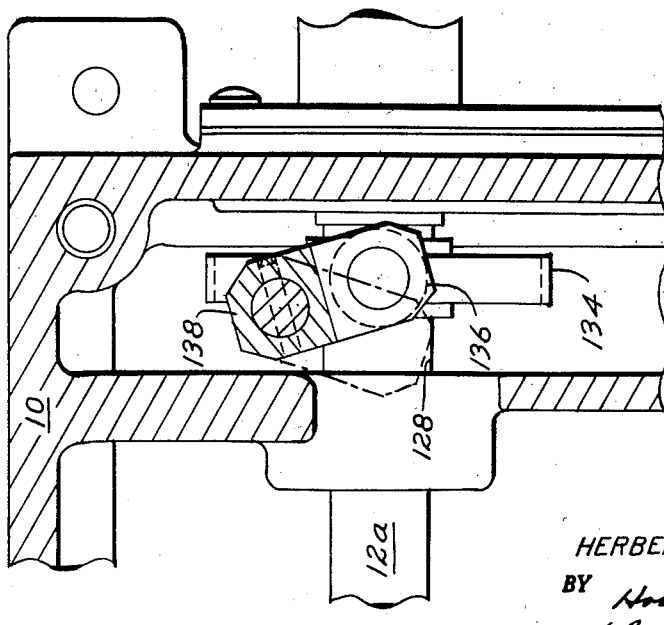
INVENTOR.
HERBERT R. UHTENWOLDT
BY
ATTORNEYS

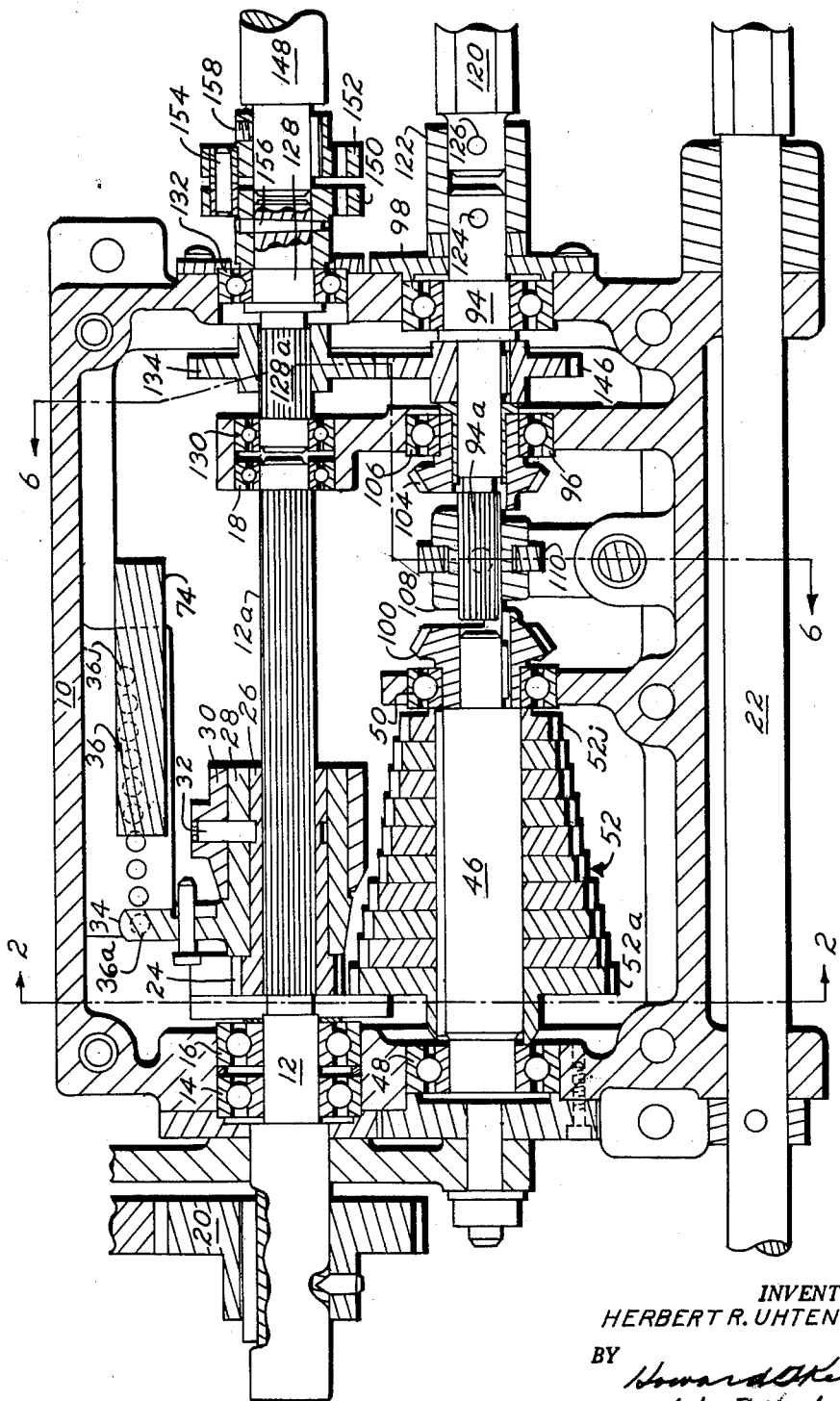

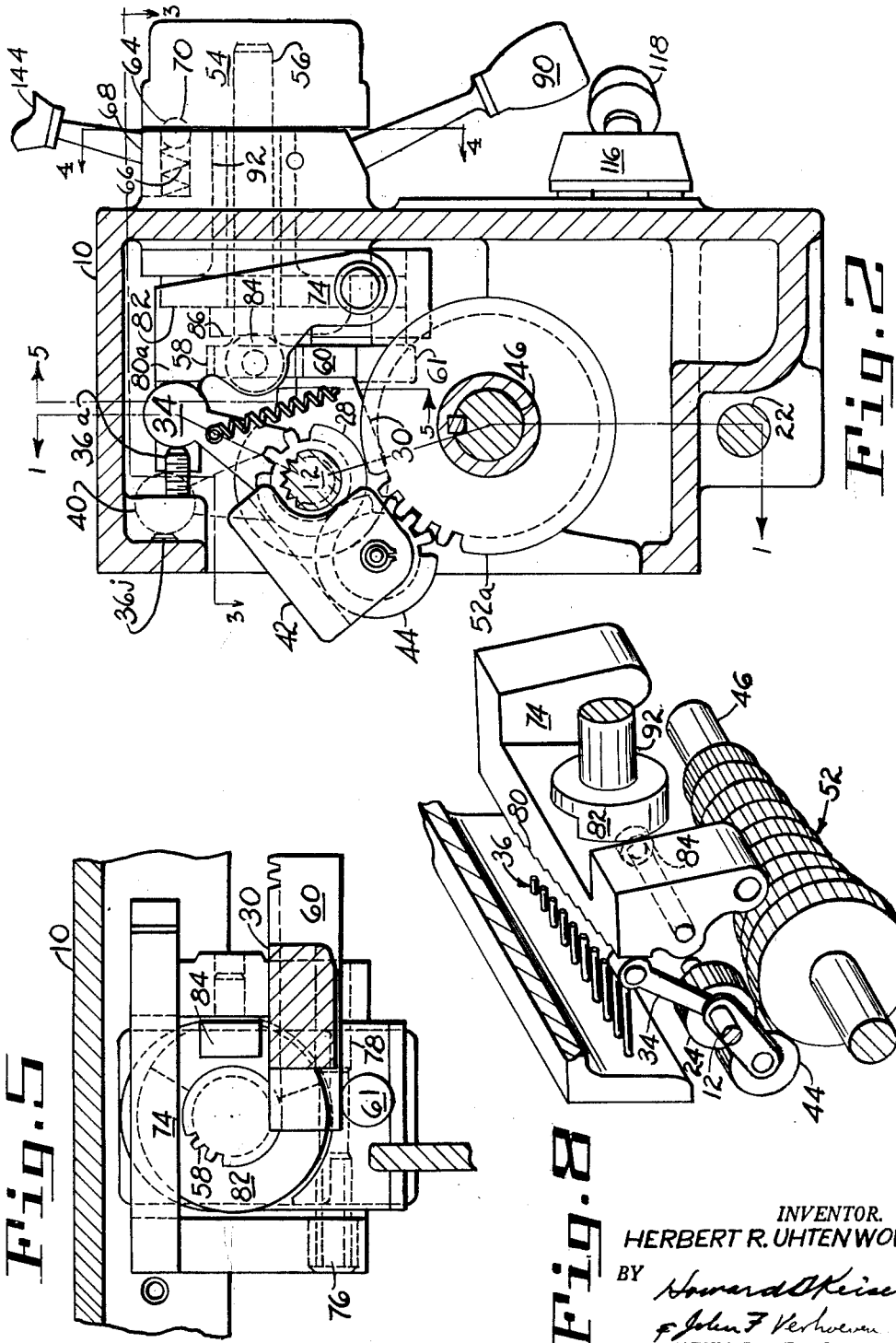

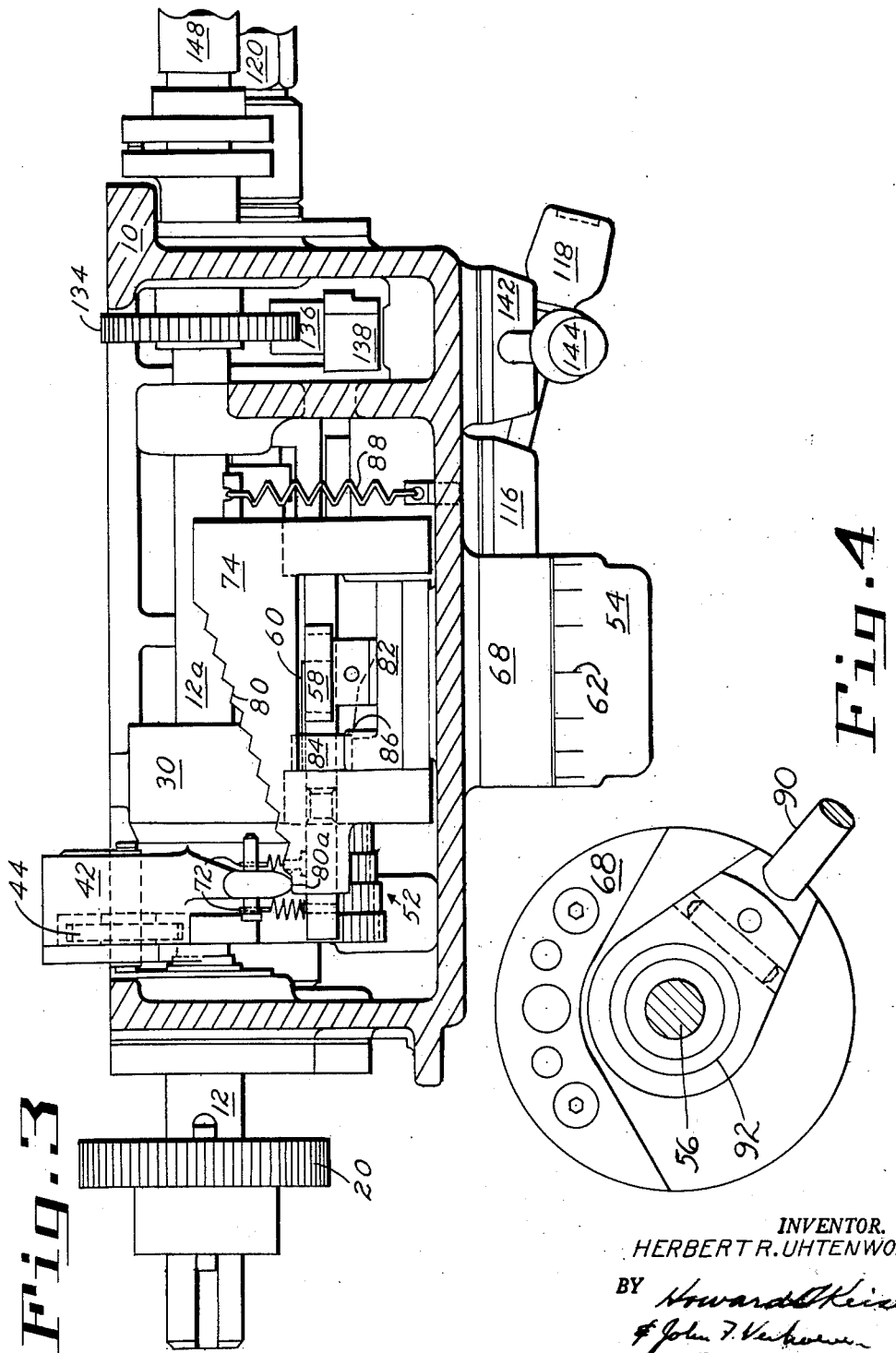

United States Patent Office 3,127,781
Patented Apr. 7, 1964

3,127,781
MACHINE TOOL TRANSMISSION
Herbert R. Uhtenwoldt, Wilmington, Ohio, assignor to The Cincinnati Milling Machine Co., Cincinnati, Ohio, a corporation of Ohio
Filed Feb. 6, 1961, Ser. No. 87,409
4 Claims. (Cl. 74—348)

This invention relates to a machine tool transmission and is particularly adapted for use as a feed box in a lathe.

A cone of gears is commonly used in the feed box of a lathe to produce a variety of feed speeds. The gears of the cone are engaged by a tumbler gear which is movable along and around the cone to obtain a meshing condition between the tumbler and each gear of the cone. In some machines, the tumbler gear is directly connected to a shifting lever which extends through an opening in the gear housing. Due to the necessity for movement of the tumbler gear along and around the cone, the opening in the feed box housing is large. The large opening presents problems in keeping the gears clean and free of foreign matter and in providing proper lubrication of the gears. Some machines have been provided with a feed box which is completely enclosed, but these boxes present other problems. Most of them use a substantial number of gears to move the tumbler gear in addition to those gears necessary to make the speed change and to transmit feed power. This increases the cost of the machine. Moreover, the mechanism is frequently large and therefore inconvenient to use. Consequently, the enclosed type of box has found acceptance mainly in the field of large expensive machines.

An object of this invention is to provide an inexpensively constructed feed box which is completely enclosed.

Another object is to provide a feed box which contains a completely enclosed mechanism that is not large and massive.

Still another object is to provide a machine tool feed box which requires only small forces acting through short distances on a control member to effect shifting of a tumbler gear along a cone or gears.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the preferred form, this invention utilizes a rack and a pinion mechanism to move the tumbler gear along the cone of speed change gears. The movement of the tumbler gear around the cone is obtained partly from a cam surface which maintains a small uniform clearance between the tumbler gear and the cone while the tumbler is moved along the cone. A locking cam surface provides the final movement of the tumbler gear around the cone to eliminate the small clearance and to insure proper meshing of the tumbler with the selected gear of the cone after the tumbler is moved to a selected position along the cone. The mechanical advantage of the locking cam surface is such that the tumbler gear is moved through the small clearance with little force required to operate the locking cam. The tumbler gear is held in engagement with the gear of the cone except when the locking cam is reversely operated to allow the tumbler to be moved away from the cone for movement therealong. By using the cam mechanism, only the rack and pinion are included in the feed box as gears which are not utilized for power transmission to a feed rod and a lead screw.

The following detailed description will give a clear understanding of the construction and operation of this invention. Reference will be made to the attached drawings in which:

FIG. 1 is a sectional view of a feed box.
FIG. 2 is a sectional view of the feed box of FIG. 1 on line 2—2.
FIG. 3 is a sectional view of the feed box on line 3—3 of FIG. 2.
FIG. 4 is a sectional view of the feed box on line 4—4 of FIG. 2.
FIG. 5 is a sectional view of the feed box on line 5—5 of FIG. 2.
FIG. 6 is a sectional view of the feed box on line 6—6 of FIG. 1.
FIG. 7 is a sectional view of the feed box on line 7—7 of FIG. 6.
FIG. 8 is a schematic view of the tumbler gear engaging mechanism of the feed box.

In the feed box housing 10, shown in FIG. 1, an input shaft 12 is received in annular bearings 14, 16, 18 for rotation by a driving train of gears (not shown) connected to the input gear 20 fixed on the end of the input shaft. The driving train of gears is connectable to a motor (not shown) by a clutching and braking mechanism (not shown) which is operated by the control rod 22 that extends through the housing 10 to the lathe apron (not shown) on one end and to the clutching and braking mechanism on the other end.

A portion 12a of the input shaft 12 is splined to receive a driving gear 24 for rotation with the input shaft. The driving gear 24 is movable along the longitudinal axis of the input shaft 12, however. Extending from the driving gear 24 and around the input shaft 12 is a cylindrical sleeve portion 26. Received over the sleeve portion 26 is a bracket bushing 28 and received around the bracket bushing is an outer sleeve member 30. A pin 32 (shown 90 degrees out of position in FIG. 1) is fixed in the outer sleeve member 30 and extends inwardly through a circumferential slot in the bracket bushing 28 into an annular groove in the sleeve portion 26. As a result of this construction, the outer sleeve member 30 and the bracket bushing 28 are relatively rotatable a limited amount while the sleeve portion 26 is completely rotatable relative to both the bracket bushing and outer sleeve member. The pin 32 maintains a fixed longitudinal relationship of the sleeve portion 26, the bracket bushing 28, and the outer sleeve member 30 so that they move in unison along the longitudinal axis of the input shaft 12.

Extending from the bracket bushing 28 is an arm 34 which is adapted to engage a stop pin 36a which is fixed in the feed box housing 10. When the arm 34 is engaged with the pin 36a as shown in FIG. 2, the bracket bushing 28 is pivotally adjusted to a predetermined position relative to the housing 10 and the locus of the input shaft 12. The stop pin 36a (see FIG. 1) is one of a series of pins 36 in the housing 10 which are spaced along the shaft 12 and which vary in height relative to one another. Pin 36a extends to the greatest height from the housing 10 while the pin 36j is the shortest pin of the series. The pins between the two extremes vary in stepped relationship from the highest pin 36a to the lowest pin 36j. As viewed in FIG. 2, the series of pins allow an angular range of adjustment of the arm 34 from that shown where the arm is engaged with pin 36a to that position 40 where the arm is engaged with the pin 36j.

Also extending from the bracket bushing 28 is a tumbler bracket 42 (see FIGS. 2 and 3) in which a tumbler gear 44 is rotatably received. The tumbler gear 44 is positioned in the bracket 42 to be in driven engagement with the driving gear 24 for all angular positions of the bracket. As the angular position of the bracket 42 is changed, the tumbler gear 44 rolls on the driving gear 24 to a corresponding angular position relative to the locus of the input shaft 12 and the driving gear which is received for rotation with the input shaft.

Located below the input shaft 12, is an output shaft 46 (FIG. 1) which is rotatably received in annular bearings 48, 50 in the housing 10. Fixed between the bearings 48, 50 for rotation with the output shaft 46 is a cone of gears 52 having a stepped relationship varying from the largest gear 52a to the smallest gear 52j of the cone of gears. All of the gears of the cone 52, the tumbler gear 44 (FIG. 2) and the driving gear 24 have the same tooth pitch. The output shaft 46 is located relative to the input shaft 12 such that with the arm 34 engaged with the pin 36a as shown in FIG. 2, the tumbler gear 44 is engaged to drive the largest gear 52a of the cone 52. If the driving gear and bracket bushing were moved to a position opposite the pin 36j (FIG. 1) so that the arm 34 would engage the pin 36j as in the position 40 (FIG. 2), the tumbler gear 44 then would engage the gear 52j of the cone 52. For each one of a series of predetermined longitudinal positions of the tumbler gear 44 there is a corresponding angular position of the tumbler gear defined by a stop pin. In each of these angular positions, there is a corresponding gear of the cone 52 which is engaged by the tumbler gear 44 to produce a predetermined speed of rotation of the output shaft 46, the speed depending on the ratio of teeth between the driving gear 24 and the gear of the set 52 corresponding to the longitudinal and angular position of the tumbler gear 44.

The longitudinal position of the tumbler gear 44 is determined by the position of a dial 54, shown in FIGS. 2 and 3. The dial 54 is fixed on the end of a shaft 56 received through the front of the housing 10. A pinion 58 is fixed on the end of the shaft 56 inside the housing 10. Engaged with the pinion 58 is a rack 60. The rack 60 is oriented parallel to the input shaft 12 and fixed to the outer sleeve member 30. The rack 60 is backed up by a roller 61 which is rotatably fixed below the rack and maintains the engagement of the rack 60 and pinion 58. Thus when the pinion 58 is rotated, the rack 60 is moved along the input shaft 12. Since the rack 60 is fixed to the outer sleeve member 30, the driving gear 24 and the bracket bushing 28 are moved along the input shaft 12 in unison with the rack 60. Thus by altering the position of the dial 54, the longitudinal position of the driving gear 24 and tumbler gear 44 along the input shaft 12 is altered correspondingly.

To insure that the tumbler gear 44 is positioned to engage one of the cone of gears 52, the dial 54 is detented to stop in predetermined positions which are marked by index lines 62 (FIG. 3). A ball 64 (FIG. 2) and spring 66 are received in a detent member 68 (FIGS. 2, 3, 4) which is fastened to the housing 10 above the shaft 56 behind the dial 54. The spring 66 (FIG. 2) urges the ball 64 into notches 70 in the back of the dial 54. Each of the notches 70 is opposite a feed speed index mark 62. Thus, the dial 54 may be moved to selected positions which result in a corresponding longitudinal position of the driving gear 24 and the tumbler gear 44. Opposite each corresponding position of the tumbler gear 44 is a predetermined gear of the cone 52 and opposite the arm 34 is a stop pin of the series 36 which allows the tumbler gear to engage the predetermined gear of the set.

A pair of springs 72 are connected between the arm 34 and a point on the outer sleeve member 30 opposite the rack 60. Since the pinion 58 and roller 61 prevent the rack and outer sleeve from rotating, the springs 72 tend to pull the arm 34 from engagement with the pins of the series 36 which causes the tumbler gear 44 to be disengaged from the gears of the cone 52. Therefore, an engaging member 74 (FIGS. 2, 3, 5, 8) is pivotally received on an axis parallel to the input 12 in the housing 10 for forcing the arm 34 into engagement with the pins of the series 36. The engaging member 74 is a cam pivotally received on pins 76, 78 (FIG. 5) in the housing 10 for movement toward and away from the pins of the series 36. During a change in position of the tumbler gear 44, the engaging member is moved to a position which allows a small clearance between the arm 34 and the stop pins 36. The engaging member 74 has a working cam surface 80 which has a stepped contour corresponding to the stepped relationship of the cone of gears 52, each step being adapted to engage the arm 34. The steps of the surface 80 also correspond to the steps in the height of the pins of the series 36. Consequently, as the arm 34 is moved along the input shaft to its selected positions, the steps of the surface 80 can be utilized to cam the arm 34 toward the stop pins which are opposite the selected positions and the tumbler bracket 42 is pivoted to maintain the tumbler gear 44 in close proximity with the cone of gears 52. As shown in FIGS. 1, 2, 3, and 8, the engaging member 74 has been moved to a position in which the clearance between the arm 34 and the stop pins 36 is eliminated and the arm 34 is forced by the step 80a toward the pin 36a. With the arm in that position, the tumbler gear 44 is engaged between the driving gear 24 and the gear 52a of the cone 52.

A rotary cam 82 (FIGS. 2, 3, 5, 8) is used to shift the cam engaging member 74 toward the stop pins 36 to eliminate the clearance between the arm 34 and the stop pins 36 which is necessary to allow the bracket 42 to be moved. The engaging member 74 has a cam following roller 84 fixed rotatably thereto and engaged with the cam surface 86 of the rotary cam 82. The surface 86 is inclined through a coarse and a fine slope so that as the cam 82 is rotated clockwise around the shaft 56 (as viewed in FIG. 3) to the position shown, the engaging member 74 is forced against the arm 34 which is moved toward the stop pin 36a by the coarse slope and then forced against the stop pin 36a (FIG. 2) by the fine slope. If the cam 82 is rotated counterclockwise, the engaging member 74 is moved away from the arm 34 by a spring 88 which is connected between the engaging member and the housing 10. The engaging member 74 is allowed to move away from the series of pins 36 far enough to allow the tumbler gear 44 (FIG. 2) to move out of engagement with the gear of the cone of gears 52 opposite which the tumbler is located. As the tumbler gear 44 is moved along the input shaft 12, the arm 34 follows the steps in the cam surface 80 of the engaging member 74. The tumbler gear 44 then is always close to the cone of gears 52.

The cam 82 is rotated by operation of a locking handle 90 (FIGS. 2, 4) which is fixed to a sleeve 92 of the cam 82 extending through the front of the housing 10 and around the shaft 56. The handle 90 is received for limited pivotal movement around the shaft 56 and between the dial 54 and the housing 10, the movement being limited by the detent member 68. Since the tumbler 44 is always close to the set of gears 52, very little movement of the arm 34 is needed to engage the tumbler gear to rotate the output shaft 46. The cam 82 produces this movement with a small amount of pivotal movement. Consequently, the movement of the handle 90 that is required is kept at a minimum. The inclined cam surface 86 gives a great mechanical advantage resulting in easy engagement of the tumbler gear 44.

The output shaft 46 (FIG. 1) is connected through a reversible transmission mechanism to an intermediate shaft 94 which is rotatably received in annular bearings 96, 98 in the housing 10. A bevel gear 100 is fixed on the end of the output shaft 46. It is engaged by a bevel gear 102 (FIG. 6), the axis of rotation of which is at a right angle to the axis of rotation of the output shaft 46. The bevel gear 102 is engaged with a bevel gear 104 (FIG. 1) rotatably received around the intermediate shaft 94 in an annular bearing 106 in the housing 10. The bevel gear 104 is connectable to the intermediate shaft 94 by a coupling member 108. The coupling member 108 is slidably received on a splined portion 94a of the intermediate shaft for rotation therewith. A shifter fork 110 (FIG. 6) is pivotally fixed to a reversing lever 112. The reversing lever 112 is fixed to a control shaft 114 on which a bushing 116 is fixed. The bushing 116 is detented by a ball 117 and a spring 119 for accurate positioning of the coupling member 108. A reversing handle 118 (FIG. 3) is fixed to the bushing 116 for rotary adjustment of the control shaft 114. When the control handle is turned to the right, the shifter fork 110 (FIG. 1) is moved to the right and the coupling member 108 is connected to the bevel gear 104 and the intermediate shaft 94 is rotated in a direction opposite to that at which the output shaft 46 is rotated. The drive to the intermediate shaft 94 comes from the output shaft 46 through the bevel gears 100, 102, 104, and the coupling member 108. If the reversing handle 118 (FIG. 3) is turned counterclockwise, the coupling member 108 is drivingly engaged with the bevel gear 100 and the drive to the intermediate shaft 94 is directly from the output shaft 46 and in the same direction.

A feed rod 120 is connected directly to the intermediate shaft 94 by a sleeve 122 and pins 124, 126. The feed rod extends to the lathe apron (not shown) where it can be connected to drive a pinion (not shown) engaged with a rack (not shown) on the lathe bed (not shown) to produce feed movement of a tool carrier (not shown).

Located above the intermediate shaft 94 is a second intermediate shaft 128 which is rotatably held in bearings 130, 132 in the housing 10. A gear 134 is slidably received on a splined portion 128a of the shaft 128 and rotatable with that shaft. A shifting fork 136 is connected to the gear 134 to move it on the shaft 128. The fork 136 (FIGS. 3, 6, 7) is pivotally connected to a lever 138 fixed on the end of a control shaft 140. A bushing 142 is fixed to the other end of the shaft 140 and has a handle 144 fixed thereto. The bushing 142 is detented by a spring 143 and a ball 145. When the handle 144 is turned to the left, the gear 134 moves to the right and engages a gear 146 (FIG. 1) fixed on the intermediate shaft 94, and the second intermediate shaft 128 is connected for rotation with the intermediate shaft 94.

A lead screw 148 is connected to the second intermediate shaft 128 by a pair of flanges 150, 152, pins 154, 156 and a set screw 158. The lead screw 148 also extends to the lathe apron (not shown) and is connectable thereto to produce a feed movement of the apron during thread chasing and similar lathe operations.

What is claimed is:

1. In a transmission mechanism having a cone of stepped gears fixed on a first shaft, a second shaft rotatable about an axis having a gear axially movable thereon, and a bracket having a tumbler gear engaged with said axially movable gear, said bracket axially movable therewith and pivotal about said axis for engagement of said tumbler gear with the gears of said cone, a tumbler gear shifting mechanism comprising in combination, a rotatably positionable speed selection dial indexed for rotation to selected positions, a rack connected to said axially movable gear and said bracket for longitudinal movement thereof in unison along said second shaft when said rack is moved longitudinally, a pinion gear connected to and rotatable with said dial, said pinion gear engaged with said rack for longitudinal movement thereof to a selected position when said dial is rotated to a corresponding selected position, a pivotal engaging member having a cam surface stepped in accordance with the gears of said cone and engaged with said bracket for pivotal movement thereof as said bracket is moved along said second shaft to maintain a predetermined clearance between said tumbler gear and the gears of said cone, fixed stop means spaced from said cone and adapted to stop pivotal movement of said bracket in predetermined angular positions as said bracket is moved along said cone, a cam follower fixed in said engaging member, a movable cam engaged with said follower, and means to move said cam to effect pivotal movement of said engaging member against said bracket for rotation thereof to eliminate the predetermined clearance between said tumbler gear and the gears of said cone and to rotate said bracket into firm contact with said stop means.

2. In a lathe feed box having a cone of stepped gears fixed on a rotatable output shaft, an input shaft parallel to and spaced from said output shaft, said input shaft rotatable about an axis, a driving gear received on said input shaft for rotation therewith and for axial movement therealong, and a bracket having a tumbler gear thereon engaged with said driving gear, said bracket axially movable therewith and pivotal about said axis for engagement of said tumbler gear with the gears of said cone, a tumbler gear shifting mechanism comprising in combination, a rotatably positionable speed selection dial indexed for rotation to selected positions, a rack connected to said driving gear and said bracket for longitudinal movement thereof in unison along said input shaft when said rack is moved longitudinally, a pinion gear connected to and rotatable with said dial and engaged with said rack for longitudinal movement thereof to a selected position when said dial is rotated to a corresponding selected position, a pivotal engaging member having a cam surface stepped in accordance with the gears of said cone and engaged with said bracket for pivotal movement of said tumbler gear as said tumbler gear is moved along said input shaft to maintain a predetermined clearance between said tumbler gear and the gears of said cone, a cam follower fixed in said engaging member, a rotatable sleeve having an inclined cam surface adapted to engage said cam follower, means to bias said engaging member toward said sleeve to hold said follower in contact with said inclined cam surface, means to rotate said sleeve to effect pivotal movement of said engaging member to pivot said bracket for elimination of the predetermined clearance between said tumbler and the gears of said cone, and fixed means spaced from said cone to engage said bracket and stop pivotal movement thereof when said tumbler gear is in driving engagement with a gear of said cone.

3. In a lathe feed box for producing selected rotation of a feed bar and a lead screw having a cone of stepped gears fixed on a rotatable output shaft, an input shaft parallel to and spaced from said output shaft, said input shaft rotatable about an axis, and a driving gear received on said input shaft for rotation therewith and for axial movement therealong, a tumbler gear shifting mechanism comprising in combination, a bracket connected to said driving gear for movement therewith along said input shaft and received around said input shaft for limited pivotal movement relative to said axis thereof, a tumbler gear rotatably received in said bracket and engaged with said driving gear, said tumbler gear engageable with the gears of said cone by pivotal movement of said bracket, a rack connected to said driving gear and bracket for movement along said input shaft when said rack is moved longitudinally, a rotatably positionable speed selection dial indexed for rotation to selected positions, a pinion gear connected to and rotatable with said dial and engaged with said rack for longitudinal movement thereof to a selected position when said dial is rotated to a corresponding selected position, an engaging member pivotal about an axis parallel to said input shaft and having a cam surface stepped in accordance with said cone of gears, means to hold said bracket in engagement with said cam surface to maintain a predetermined clearance between said tumbler gear and the gears of said cone as said tumbler gear is moved along said input shaft, a cam follower fixed in said engaging member, a sleeve having an inclined cam surface on one end, said sleeve rotatable about an axis transverse to the axis of pivot of said engaging member, means to bias said engaging member toward said inclined cam surface and to hold said follower in contact therewith, means to rotate said sleeve to effect pivotal movement of said engaging member and bracket for elimination of the predetermined clearance between said tumbler gear and the gears of said cone, and fixed means spaced from said cone and adapted to stop pivotal movement of said bracket when said clearance is eliminated and said tumbler gear is in driving engagement with a gear of said cone.

4. In a lathe feed box for producing selected rotation of a feed bar and a lead screw, said feed box having a cone of stepped gears fixed on a rotatable output shaft, an input shaft parallel to and spaced from said output shaft and rotatable about an axis, and a driving gear receiving on said input shaft for rotation therewith and for axial movement therealong, a tumbler gear shifting mechanism comprising in combination, a bracket connected to said driving gear for movement therewith along said input shaft and received around said input shaft for limited pivotal movement relative to said axis thereof, a tumbler gear rotatably received in said bracket and engaged with said driving gear, said tumbler gear engageable with the gears of said cone by pivotal movement of said bracket, a rack connected to said driving gear and bracket for movement along said input shaft when said rack is moved longitudinally, a rotatably positionable speed selection dial detented for rotation to selected positions and having a shaft extending therefrom, said dial and shaft rotatable about an axis transverse to said input shaft, a pinion gear fixed to said shaft extending from said dial and engaged with said rack for longitudinal movement thereof to a selected position when said dial is rotated to a corresponding selected position, an engaging member pivotal about an axis parallel to said input shaft and having a cam surface stepped in accordance with said cone of gears, means to hold said bracket in engagement with said stepped cam surface to maintain a predetermined clearance between said tumbler gear and the gears of said cone as said tumbler gear is moved along said input shaft, a cam follower fixed in said engaging member, a rotatable sleeve received around said shaft extending from said dial having an annular inclined cam surface on one end, means to bias said engaging member toward said inclined cam surface to hold said follower in contact therewith, means to rotate said sleeve to effect pivotal movement of said engaging member and bracket for elimination of the predetermined clearance between said tumbler gear and the gears of said cone, and a set of fixed stop pins spaced from said cone and stepped in accordance with said stepped cam surface, said pins adapted to engage said bracket when said clearance is eliminated and said tumbler gear is in driving engagement with a gear of said cone.

References Cited in the file of this patent

UNITED STATES PATENTS

| | | |
|---|---|---|
| 2,374,322 | Bickel | Apr. 24, 1945 |
| 2,662,417 | Mascherpa | Dec. 15, 1953 |
| 2,673,472 | Dickas | Mar. 30, 1954 |
| 2,743,622 | Haupt | May 1, 1956 |
| 3,058,365 | Gerchow | Oct. 16, 1962 |

FOREIGN PATENTS

| | | |
|---|---|---|
| 327,818 | Switzerland | Feb. 15, 1958 |